W. M. HUTTON.
BRIDLE-BIT.
No. 190,969. Patented May 22, 1877.
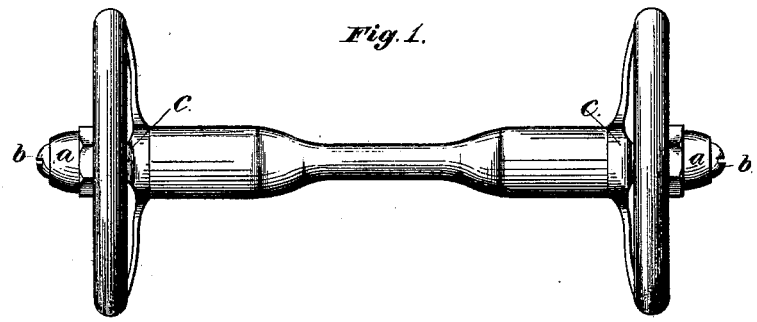
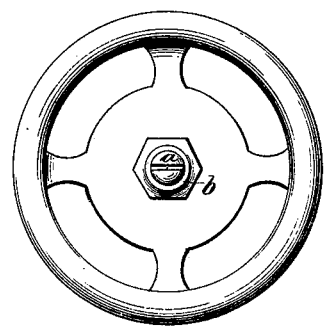
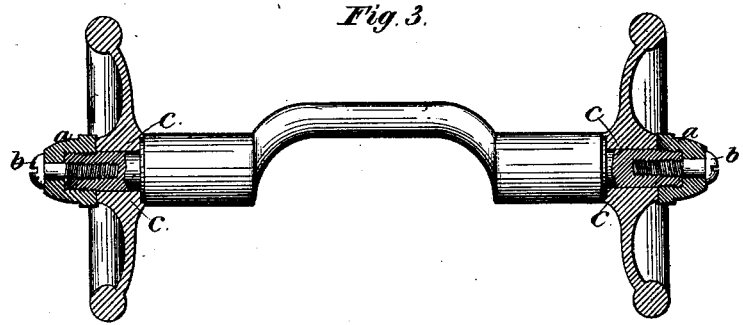
Witnesses.
Robert Sanderson
Thomas M Hight
Inventor.
Walter M Hutton

UNITED STATES PATENT OFFICE.

WALTER M. HUTTON, OF CLEVELAND, OHIO.

IMPROVEMENT IN BRIDLE-BITS.

Specification forming part of Letters Patent No. 190,969, dated May 22, 1877; application filed July 17, 1876.

*To all whom it may concern:*

Be it known that I, WALTER M. HUTTON, of Cleveland, in the county of Cuyahoga and State of Ohio, have invented a certain new and useful Improvement in Bridle-Bits for Horses, &c.; and I do hereby declare that the following is a full, clear, and complete description thereof, reference being had to the accompanying drawings, making a part of the same.

Figure 1 is a side view of the bit. Fig. 2 is an end view, showing one of the cheek-pieces or ring-plates. Fig. 3 is a view of the bit, showing the curved bar with the cheek-pieces and devices for attaching said pieces and bar together.

Like letters of reference refer to like parts in the several views.

The object of my invention is to produce a bridle-bit for horses, &c., which will, in a great measure, prevent the mouth and tongue of the animal from becoming chafed or injured from the use of it, as the animal will be at liberty to roll the bit and adjust it, as the bar is so arranged in relation to the cheek-pieces or wheels that it may be turned in the mouth by the tongue. The bar and cheek-pieces are connected and fitted loosely together, and by means of cap-nuts and set-screws the several parts of the bit are secured to each other, as herein shown.

The bar is curved or recessed, forming a recess in its central part, as seen in Figs. 1 and 3, to allow room for the tongue of the animal, and thereby relieve it from chafing of the bit.

The ends of the bit-bar pass freely through the cheek-pieces, to allow the said bar and cheek-pieces to turn independently of each other, which allows of the bar being turned by the tongue of the animal to an easy position for the mouth. The cheek-pieces are secured on the ends of the bar by means of the cap-nut $a$ and a set-screw, $b$, as seen in Fig. 3. The cap-nuts screw onto the ends of the bar, and the set-screws pass through the cap-nuts, and screw into the central ends of the bar.

This arrangement securely connects the cheek-pieces and bar together, and at the same time the bar and cheek-pieces are so fitted together as to turn loosely.

The cap-nut $a$ forms a shoulder on one side of the cheek-piece, and on the other is the shoulder of the bar, the latter shoulder loosely fitting in an annular rabbet or recess in the cheek-pieces, as seen at $c$, Fig. 3. In the cheek-pieces are slots or openings for the attachment of the lines and other parts of the head-gear of the harness.

What I claim as my invention, and desire to secure by Letters Patent, is—

In a bridle-bit, the combination of the recessed or curved bar, the revolving slotted cheek-pieces, the nuts $a$, and the screws $b$, all arranged substantially as shown and described, and for the purpose set forth.

WALTER M. HUTTON.

Witnesses:
ROBERT SANDERSON,
THOMAS M. HIGHT.